United States Patent [19]

Schuster et al.

[11] 4,195,549
[45] Apr. 1, 1980

[54] PINTLE WIRE FOR HIGH LOAD HINGE CONNECTIONS

[75] Inventors: Wilhelm Schuster, Frankfurt; Klaus Wollmann, Eschhofea, Jürgen Stal, Mörfelden-Walldorf, Fed. Rep. of Germany

[73] Assignee: Filztuchverwaltungs-GmbH, Frankfurt am Main, Fed. Rep. of Germany

[21] Appl. No.: 493,980

[22] Filed: Aug. 1, 1974

Related U.S. Application Data

[63] Continuation of Ser. No. 192,008, Oct. 26, 1971, abandoned.

[30] Foreign Application Priority Data

Oct. 30, 1974 [DE] Fed. Rep. of Germany ....... 2053273

[51] Int. Cl.² .................... D04C 1/06; D04C 1/12
[52] U.S. Cl. .............................. 87/1; 87/6; 57/234

[58] Field of Search .................. 87/1, 6, 7, 8, 23; 57/149, 162, 7, 157, 217, 221, 223, 232, 234

[56] References Cited

U.S. PATENT DOCUMENTS

| 2,930,106 | 3/1960 | Wrotnowski et al. | 28/1 TEF |
| 3,124,032 | 3/1964 | Webster et al. | 87/1 |
| 3,403,595 | 10/1968 | Watson | 87/1 |

FOREIGN PATENT DOCUMENTS 997354 7/1965 United Kingdom .......................... 87/1

Primary Examiner—John Petrakes
Attorney, Agent, or Firm—Becker & Becker, Inc.

[57] ABSTRACT

A pintle wire for high load hinge connections, especially for textile webs and transmission belts, and method of making same, according to which continuous synthetic fibers are braided individually or in strands and are embedded in high wear resistant and hydrolysis resistant duroplastic material and interconnected thereby.

3 Claims, 5 Drawing Figures

PINTLE WIRE FOR HIGH LOAD HINGE CONNECTIONS

This is a continuation of application Ser. No. 192,008, filed Oct. 26, 1971, now abandoned.

The present invention relates to a pintle wire for high load hinge connections for textile web structures, transmission belts, or the like, and also concerns a method of producing such pintle wires. By means of such hinge connections, for instance, textile webs, such as drying felts and screens for paper machines, belts for power transmissions, and the like, are connected to form endless belts.

Multilayer connecting bolts or pintle wires are known which comprise a high wear resistant core of synthetic material, the core being surrounded by at least one layer of wear resistant braiding of synthetic material which after having been placed on the core is covered by a resin coating.

Pintle wires of the above mentioned type, however, have the drawback that at the contact areas of the hinge elements with the braiding the outer resin coating will be damaged in the course of time and will be cut through so that a fraying of the braiding will result.

In addition to the thus reduced strength of the connecting pin at these areas, there is to be mentioned that after the cutting through of the resin coating, the fibers of the braiding as well as the core material are exposed to chemical influences. In paper making machines, the hydrolytic disintegration and the influence of the solvents, which among others are employed for cleaning the covering, result in a rather fast destruction of the connecting pins.

It is, therefore, an object of the present invention, for purposes of overcoming the above outlined drawbacks, to develop a pintle wire which even at temperatures of from 150° to 200° C. can be mechanically subjected to high loads and in addition thereto will be resistant against chemical actions, such as a hydrolytic disintegration by solvents, etc.

It is a further object of this invention so to design the pintle wire or pin that it will be sufficiently elastic to permit its removal at any time so that even after a long period of operation no interfering elevations or depressions will form on its circumference or no other permanent deformations will occur.

These and other objects and advantages of the invention will appear more clearly from the following specification in connection with the accompanying drawings, in which.

Figure 3:
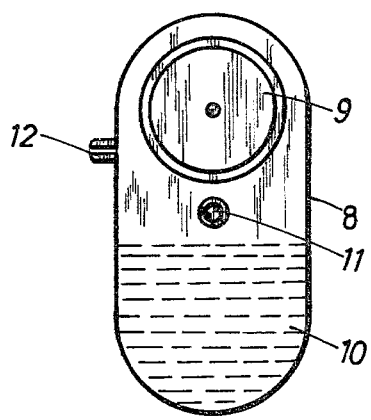

FIG. 3 diagrammatically illustrates an impregnating and evacuating container for use in connection with the method according to the invention.

Figure 4:
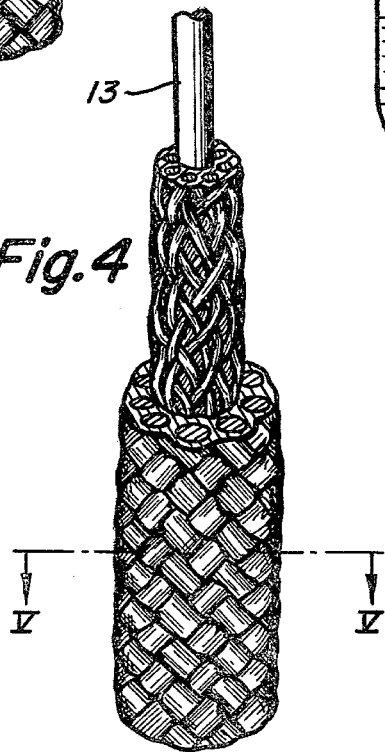

FIG. 4 is a perspective view of a modified pintle wire according to the invention.

Figure 5:
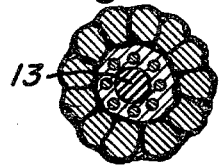

FIG. 5 is a section taken along the line V—V of FIG. 4.

The problem underlying the present invention have been solved by designing the pintle wire of synthetic fibers, preferably continuous synthetic fibers, which are braided individually or in strands and which are completely embedded in a high wear resistant and hydrolysis resistant duroplastic synthetic material and by said material are connected to each other.

The pintle wire or pin thus consists of a wear resistant duro-plastic synthetic material which is resistant against chemical actions, especially hydrolysis, and which is armed by a skeleton of interwoven synthetic fibers. In contrast to heretofore known wires or bolts, the various properties, such as high strength, temperature stability, chemical stability, etc., are not obtained by a multilayer construction, but are obtained by a practically homogeneous structure of a wire consisting of armed duroplastic synthetic material. When the cross section of the wire is reduced or weakened, for instance, by damage to the surface thereof, a fraying and thereby an exposure of the synthetic fibers sensitive to chemical influences will be avoided. On the other hand, by the embedding of the braiding, high mechanical strength, elasticity, the ability of retaining its shape, and, in view of the duroplastic synthetic material, a high wear resistance of the pintle wire will be assured.

In conformity with the present invention, the synthetic fibers may have the shape of round or tubular braided hoses or sheaths arranged coaxially one above the other which hoses or sheath are interconnected by the duroplastic synthetic material. In this connection it has proved particularly advantageous to provide two such coaxial hoses or sheaths and to design the synthetic fibers of the inner hose or sheath so that they have a diameter of about ten to twenty times the diameter of the synthetic fibers of the outer hose or sheath.

Although generally an axial hollow chamber, as it is formed, for instance, with a pintle wire composed of two permeated coaxial hoses or sheaths, is advantageous for the elasticity of the pintle wire, it may be favorable, particularly with very thin wires, to insert a core of monofil steel wire or of multifil steel wire in order, among other advantages, to increase the bending strength of long wires. The core may, in order to strengthen the connection between the core and the embedded material, be provided with a material aiding in such connection or adhesion.

Synthetic fibers employed for the pintle wire or pin according to the invention may consist of polyesters and/or polyamides, especially modified polyethyleneglycolterephthalate, and a polyamide known in the trade as polyamide or nylon 66.

In many instances it is advantageous to add to the duroplastic synthetic material lubricants, such as finely distributed polytetrafluoroethylene. This is advantageous, for instance, when a plurality of parallel pintle pins or connecting bolts are inserted into the hinge.

The present invention furthermore concerns a method of producing pintle wires as set forth above, which method is characterized primarily in that a preferably hose-shaped multilayer skeleton of braided synthetic fibers is first desized by means of a solvent, is subsequently dried, and then introduced into a container in which locally separated from the synthetic fibers there is contained an impregnating fluid which after removal of its solvent and after hardening forms a duroplastic synthetic material. The method according to the invention is furthermore characterized in that the container is evacuated and subsequently the synthetic fibers are within the container immersed in the permeating fluid whereupon by means of a water-free gas an over-pressure of from 5 to 10 atmospheres above atmospheric pressure is produced in the container and maintained for a number of hours. After pressure equalization has occurred in the container, the impregnated synthetic fibers are withdrawn through a calibrated nozzle from the container and through a passage heated up to a temperature of from 50° to 100° C. are for purposes of hardening the duroplastic synthetic material wound onto a drum provided with profiled rollers.

According to a particularly advantageous way of practicing the method according to the invention, it is suggested to apply wetting agents, preferably fluor chemicals, to the surface of the braided synthetic fibers prior to their immersion into the impregnating fluid. As fluor chemicals, perfluorocarbonic acid and perfluorosulfonic acid may be employed. Such wetting agent may be added, for instance, to the solvent for desizing the braided synthetic fibers while the wetting agent must after the drying step remain at least partially on the synthetic fibers.

In conformity with the present invention, a wetting agent, for instance, likewise a fluor compound, may be added to the impregnating fluid.

In order to increase the length stability of the pintle wire, it is advantageous to expose the pin or wire after the hardening of the duroplastic synthetic material to a heat treatment of approximately 150° C. for a number of hours.

Figure 1:
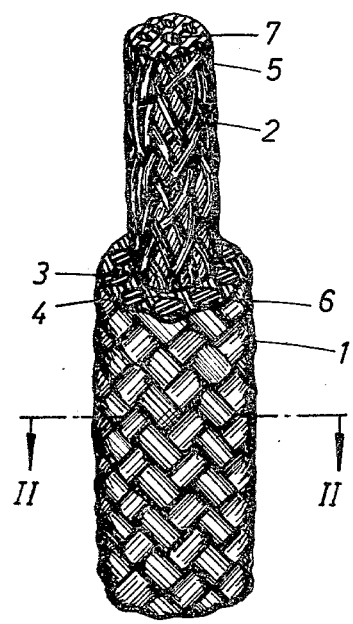
FIG. 1 is a perspective view of a pintle wire according to the invention with partially removed outer core.

Referring now to the drawing in detail, the insert wire or pin as illustrated in FIG. 1 comprises two round braided coaxial hoses or sheaths 5 and 6 of synthetic fibers of different thicknesses. Whereas the strands 1 braided to form the outer hose 6 are composed of numerous thin synthetic fibers 3 (see FIG. 2), the braiding of the inner hose or sheath 5 is formed by monofil synthetic fibers 2 the diameter of which, according to a particularly advantageous design of the invention, corresponds approximately to ten times the diameter of the synthetic fibers 3 of the outer hose or sheath 6. By a suitable selection of the thickness of the fibers and the type and density of the braiding, the absorbed quantity of duroplastic synthetic material as well as the elasticity and loadability of the pintle wire can be adapted to the respective specific requirements while taking into consideration the different loadability at the surface and in the interior of the wire by different fiber materials and different fiber thicknesses for the inner and outer braiding.

Figure 2:
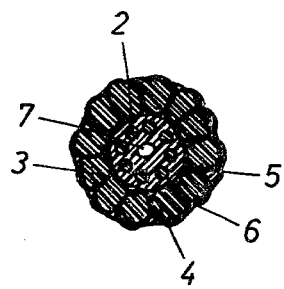
FIG. 2 is a section taken along the line II—II of FIG. 1.

The different structure of the braiding in the exterior and the interior of the wire is particularly clearly shown in the cross section of FIG. 2. In the interstices between the relatively thick synthetic fibers 2 and also between the fine synthetic fibers 3 of each strand 1 and in the meshes formed by these strands 1, furthermore between the inner and the outer hoses 5, 6 and finally over the circumference of the outer hose 6 there is provided a high wear rsistant and hydrolysis resistant duroplastic synthetic material 4 which in specific instances may contain a lubricant, such as polytetrafluoroethylene.

The inner hose 5 generally surrounds an axial hollow chamber 7 into which, inherent to the method according to the invention, more or less duroplastic synthetic material 4 may enter.

According to a modified embodiment of the invention shown in FIGS. 4 and 5, in the interior of the pintle wire there may be provided a core 13 of monofil steel wire or of multifil steel wire which core is surrounded by one or more hoses of braided synthetic fibers permeated with duroplastic synthetic material. This design is particularly advantageous when very fine wires are necessary or required.

In connection with the production of a pintle wire according to the present invention it may sometimes be difficult so to insert the duroplastic synthetic material 4 into the skeleton of synthetic fibers 2, 3 that actually each fiber will be embedded in the synthetic material 4 and will be connected to the other fibers. In order to assure such structure, it is suggested for purposes of making the pintle wire according to FIGS. 1 and 2, 4 and 5, first to braid the two hoses or sheaths 5 and 6 one upon the other and subsequently to desize these fibers, which may consist of polyesters or polyamides, by means of a standard solvent or a mixture of solvents, and then to dry the same. Such solvent mixture may consist for instance of 70% xylol and 30% ethyleneglycol acetate. Subsequently, this skeleton wound upon a drum 9 and consisting of the braided synthetic fibers 2 and 3 is introduced into a container 8 (see FIG. 3) in which locally separated from the drum 9 there is provided a permeating fluid 10 which by removal of its solvent and by hardening is converted into a duroplastic synthetic material. The entire container 8 is after the insertion of the drum 9 with the fibers wound thereupon first evacuated and subsequently, while maintaining the vacuum, is pivoted about the central shaft 11 so that the drum 9 with the synthetic fibers 2, 3 would thereon will immerse into the permeating fluid 10. In this way it will be assured that the permeating fluid 10 will as completely as possible enter into the interstices between the synthetic fibers 2, 3. This may be further aided by the addition of a wetting agent, such as a fluor compound, into the fluid 10. It is also possible already during the desizing operation or subsequently thereto to apply a wetting agent to the surface of the synthetic fibers.

In order to assure that the permeating fluid and thereby the duroplastic synthetic material formed therefrom will also enter into the narrowest interstices between the fine synthetic fibers, an over-pressure of approximately from 5 to 10 atmospheres above atmospheric pressure is by means of a water-free gas produced in the tilted container 8, i.e. while the drum 9 is in the permeating fluid, the over-pressure being maintained for a number of hours, e.g. two hours. Subsequently, the now permeated skeleton formed by the braided synthetic fibers 2 and 3 may through a calibrated nozzle 12 be pulled out of the container 8 and may be introduced directly into a heating passage in which the removal of the solvent and the hardening of the duroplastic synthetic material begins. Finally, the pintle wire or pin is wound upon a drum and is introduced into corresponding profiled grooves which during the final hardening of the duroplastic synthetic material will prevent the windings from sticking to each other.

For purposes of improving the length stability of such pintle wires or in order to prevent that the pintle wires will in response to an increase in temperature during the operation be shortened in a non-controllable manner, the pintle wire according to the invention may, following the hardening of the duroplastic synthetic material, be exposed for a number of hours, e.g. two hours, to a temperature of approximately 150° C.

EXAMPLE

A polyester yarn of continuous fibers is braided around a hose-shaped braided cord or strand of single filament or monofil polyester wires so that a cord or strand will be formed having a diameter of 2 millimeters. This cord or strand is with a desired length wound upon a preparing reel. It is on this reel that the cord or strand is cleaned by washing with trichloroethylene to which latter compound 0.2% of perfluorcarbon have been added. Subsequently, the reel is inserted into a drying chamber having a temperature of 70° C., and the solvent is removed. The perfluorcarbonic acid components dissolved in the solvent remain on the material.

The reel is then rotatably mounted in the upper part of the impregnating autoclave. The start of the cord or strand is passed through a pull nozzle and knotted at this place, and said nozzle is closed with a sealed stopper.

The impregnating liquid is filled into the lower portion of the autoclave, said impregnating liquid consisting of:
- 38% of modified polyethyleneglycolterephthalate
- 42% of Xylol
- 18% of ethylglycolacetate
- 1.5% of PTFE-powder
- 0.5% of dye pigment.

The upper portion of the autoclave which contains the reel with the cord or strand is now placed upon the lower portion of the autoclave and tightly screwed thereonto. Subsequently, the air is pumped out of the autoclave by means of a vacuum pump. After a two hour evacuating period a pressure of approximately 15 Torr is obtained. After this vacuum has been established, the autoclave is turned by 180° so that the cord or strand reel is now in the lower portion of the autoclave and is covered by the preparing liquid. The vacuum pump remains connected to the autoclave for another hour. Subsequently, by closing the vacuum conduit and opening the pressure line, air is admitted to the autoclave until in the autoclave a pressure of 6 atmospheres above atmospheric pressure has been established. This pressure is maintained for two hours, whereupon the pressure line is closed and the air is slowly discharged by opening a vent.

The closure cap above the nozzle may now be screwed off. The impregnated wire or cord is now pulled out of the autoclave through a calibrated nozzle and is passed through a drying passage and is connected to the winding drum. By turning on the drive for the drum, the cord is at low speed of one meter per minute passed through the drying passage heated to 90° C. and is subsequently wound into the profiled grooves of the winding drum. After the entire cord quantity has been drawn off, the winding drum is heated for four hours to a temperature of 50° C. in order to completely remove the solvent from the wire.

Following the cooling off of the winding drum, the wire is would off and condensation of the polyester is effected for two hours in the drying chamber at a temperature of 150° C.

The present invention also covers a pintle wire which excels primarily by its resistance against chemical influences, its high mechanical loadability or strength and by its temperature resistance and its elasticity. These properties are maintained in view of the practically homogeneous construction of the pintle wire according to the invention, even when the surface of such wire is damaged.

It is, of course, to be understood that the present invention is, by no means, limited to the particular showing in the drawings and the method set forth above, but also comprises any modifications within the scope of the appended claims.

What we claim is:

1. A pintle wire for high load hinge connections, especially of textile webs and transmission belts, which includes in combination a braided inner tubular sheath of synthetic monofilaments, a braided outer tubular sheath of synthetic fibers, the monofilaments of said inner sheath having a diameter from 5 to 20 times the diameter of the fibers of said outer sheath, a hydrolysis-resistant synthetic plastic material impregnating and embedding said tubular sheaths therein, and polytetrafluoroethylene incorporated in said synthetic plastic to form a lubricant therein.

2. A pintle wire in combination as claimed in claim 1 in which said inner tubular sheath of synthetic monofilaments is surrounded by said outer tubular sheath and both said sheaths are embedded in duroplastic synthetic plastic material.

3. A pintle wire in combination as claimed in claim 2, in which said plastic material is in hardened condition after application of heat and pressure thereto.

* * * * *

UNITED STATES PATENT AND TRADEMARK OFFICE
CERTIFICATE OF CORRECTION

PATENT NO. : 4195549

DATED : 1 April 1980

INVENTOR(S) : Wilhelm Schuster et al

It is certified that error appears in the above–identified patent and that said Letters Patent are hereby corrected as shown below:

[73] Assignee: Filztuchverwaltungs-GmbH,
Mörfelden-Walldorf,
Federal Republic of Germany Signed and Sealed this Eighth Day of July 1980

[SEAL]

Attest:

SIDNEY A. DIAMOND

Attesting Officer

Commissioner of Patents and Trademarks